United States Patent [19]

Preuss

[11] 4,144,542

[45] Mar. 13, 1979

[54] AUDIO-VISUAL REPRODUCTION DEVICE

[75] Inventor: Heinz Preuss, Hannover, Fed. Rep. of Germany

[73] Assignee: BTS - Systemtwicklungs GmbH, Berlin, Fed. Rep. of Germany

[21] Appl. No.: 853,174

[22] Filed: Nov. 21, 1977

[30] Foreign Application Priority Data

Nov. 22, 1976 [DE] Fed. Rep. of Germany ....... 2652936

[51] Int. Cl.² .......................... H04N 5/84; G11B 7/24
[52] U.S. Cl. ............................... 358/9; 179/100.3 V; 250/570; 358/128
[58] Field of Search ............... 358/128, 4, 9; 365/127, 365/120, 215, 234; 179/100.3 V; 250/202, 570

[56] References Cited

U.S. PATENT DOCUMENTS

| 3,534,166 | 10/1970 | Korpel | 358/128 X |
| 3,946,367 | 3/1976 | Wohlmut et al. | 179/100.3 V |
| 4,006,293 | 2/1977 | Bouwhuis et al. | 358/128 |
| 4,051,529 | 9/1977 | Braat | 358/128 |

Primary Examiner—Bernard Konick
Assistant Examiner—Donald McElheny
Attorney, Agent, or Firm—Walter Becker

[57] ABSTRACT

The specification describes an audio-visual reproduction device for transmitted light recordings of picture, audio and control signals, in a spiral on a disc-shaped information vehicle. Adjacent to the information vehicle there is an arrangement, including on one side an illuminating device and on the other side an optical sensing device for the signals. Furthermore means are provided by which the signals from the information vehicle are converted into pulses processed by a TV receiver. Displacements of the vehicle in the direction perpendicular to its plane are compensated for on the basis of optical signals. Picture, audio and control signals of the information track are continuously projected on to a single line photodiode array by an objective, which is caused automatically to follow the vertical displacements of the information vehicle, that is to say such displacements as occur perpendicularly to its plane. The information track has a strip-like control track for compensating for vertical displacements. Means are provided for resetting the lateral drift of the light cone which is incident on the photodiode array from the objective, in accordance with the illumination of diodes intended for the compensation of the horizontal displacements of the information vehicle by virtue of the signal track associated with these diodes. Means are provided for follow-up of the objective in accordance with the illumination of the diodes intended for the compensation of the vertical displacements of the information vehicle by means of the control track associated with these diodes.

8 Claims, 10 Drawing Figures

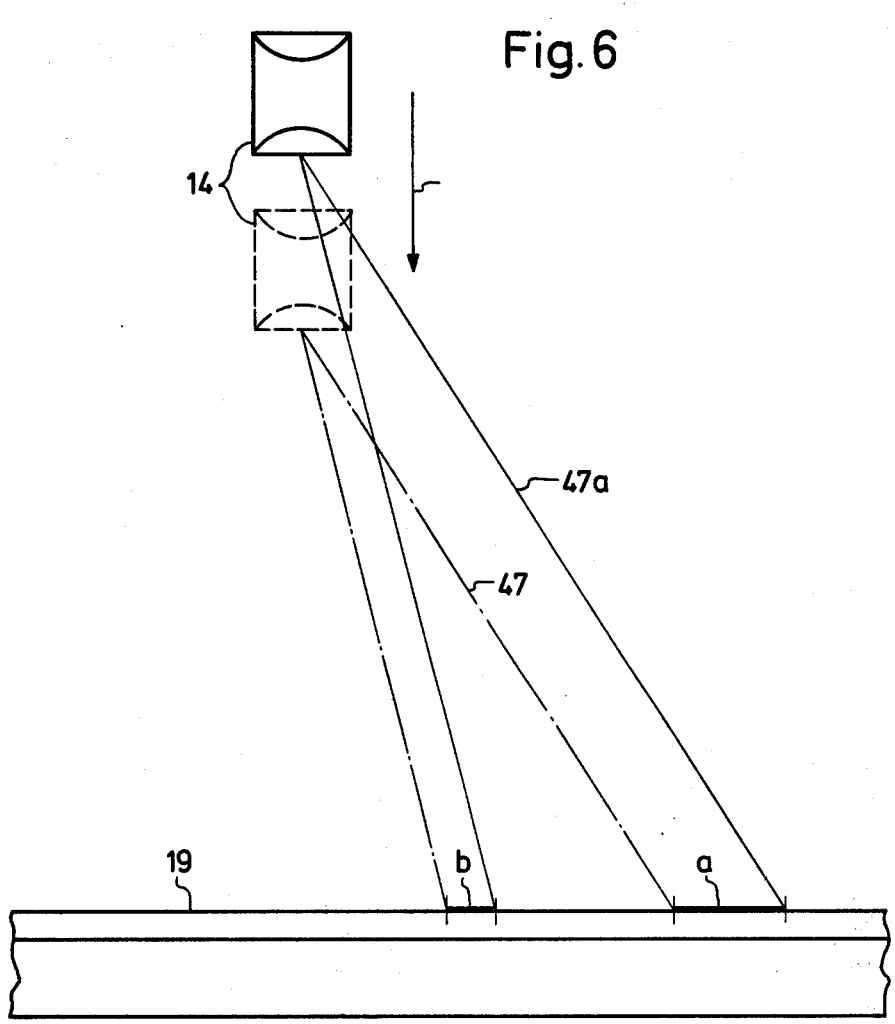

AUDIO-VISUAL REPRODUCTION DEVICE

BACKGROUND OF THE INVENTION

The invention relates to an audio-visual reproduction device for transmitted light recordings of picture, audio and control signals, which associated with each other directly in a certain order on a spiral are provided on a disc-shaped information vehicle adapted to be turned about the center point of the spiral at an even speed of performance, and adjacent to the information vehicle there is an arrangement, adapted to move in the direction radial with respect to the spiral on lead screws in synchronism with the playback of the information vehicle, the arrangement comprising on one side of the information vehicle an illuminating device and on the other side an optical sensing device for the picture, audio and control signals and furthermore means are provided by means of which the signals originating from the information vehicle are converted into electric pulses, which can be processed by a TV receiver, and displacements of the information vehicle in the direction perpendicular to its plane are compensated for on the basis of optical signals in order to keep in focus an objective for the picture signals and these optical signals can be derived from a signal track of the information vehicle and they change in accordance with its displacement perpendicular to its plane.

Such reproducing devices can be used for the playback of optical information vehicle discs with spirally arranged moving picture and audio recordings and their representation by means of a TV set. In this case the picture recordings are direct images, which can be reduced in size as far as the limit of resolution of the image vehicle layer employed, for example down to a size of 2 square millimeters in area, and it is not necessary to convert the images into linear signals for the information vehicle. The images therefore retain their complete two-dimensionally arranged information content and as a result require a smaller overall area. The optical storage of the overall information content therefore makes possible in a simple manner a duplication of the information vehicle photographically or by a printing process. Such reproducing devices are furthermore suitable for the reproduction of selected individual images and can therefore be used as an information memory, from which individual pieces of information can be read out.

The German specification (Offenlegungsschrift) 2,121,379 describes such a reproducing device in the case of which an objective, adapted to follow the perpendicular displacements of the information vehicle is provided and which serves for reading out the picture information. The control of the objective is ensured by photo-electric sensors, which register the changes due to the vertical movements of the disc, in the optical control signals supplied to the sensors and the latter regulate the excitation of magnets, which bring the objective into focus in each case as required. However the compensation for changes in the audio and control signals as a consequence of perpendicular displacements of the information vehicle disc is neglected and there is furthermore as a whole no compensation or displacements of the information vehicle in its radial plane, which are to be mechanically suppressed.

For the conversion of the optical signals into electrical ones a TV camera is provided, which more especially as regards color reproduction brings about substantial losses of information from the information content of the information vehicle employed. The use of a TV camera furthermore means that the picture frequency on playback of the information vehicle must be adapted to the frequency of the TV set driven by the TV camera. For switching over from one image to the next one any conversion of the moving image into a still image viewed by the TV camera the German specification proposes the use of a rotary prism, that is to say a mechanical component which will be subject to wear and is not free of mechanical displacements or misalignments.

SHORT SUMMARY OF THE INVENTION

One aim of the invention is that of compensating for the disc displacements occurring and which in practice cannot be suppressed, in all three dimensions with respect to all signal pickup devices in a similar manner and to provide a simple wearfree arrangement for converting optical signals into electrical ones, with which by storage of the picture information the necessity of merging the playback frequency to the picture frequency of the TV set does not arise.

In accordance with the invention in order to achieve this aim and other aims the picture, audio and control signals of the information track are continuously projected on to a single line photo-diode array by an objective, which is caused automatically to follow the vertical displacements of the information vehicle, that is to say such displacements as occur perpendicularly to its plane, and the information track has mutually parallel tracks for black and white picture information, optical audio information, an optical strip-like signal track for compensating for horizontal displacements of the information vehicle, that is to say such displacements which occur in its plane in the radial direction, a signal track for controlling the speed of rotation, necessary for an even playback of the information track, of the drive motor for the turntable holding the information vehicle and a strip control track for compensating for vertical displacements of the information vehicle, and the photo-diode array is subdivided up into diode groups, which correspond to the projected images of these above mentioned tracks, and are arranged to be independent of each other in order to prevent overlap of signals, by the use of non-photo-sensitive intermediate spaces, and means are provided for resetting the lateral drift of the light cone which is incident on the photo-diode array and comes from the objective, in accordance with the illumination of diodes intended for the compensation of the horizontal displacements of the information vehicle by virtue of the signal track associated with these diodes and furthermore means are provided for follow-up of the objective in accordance with the illumination of the diodes intended for the compensation of the vertical displacements of the information vehicle by means of the control track associated with these diodes.

The means for restoring the light cone, coming from the objective and incident on the array, into its normal position can be a parallel faced quartz plate arranged in a rotatable fashion in the ray path following the objective, or a regulating device for controlling the speed of rotation of the motor driving the lead screw, with which the illuminating device and the optical system provided for pickup of the information of the information vehicle, and the photo-diode array, can be moved radially with respect to the information vehicle.

The dependency of the compensation for the displacements of the information vehicle on the illumination of the diode groups, intended for the associated resetting control means can be brought about an arrangement such that the diode groups, intended for the resetting control of the changes in position due to displacements in the information vehicle, of the light cone coming from the objective, of the photo-diode array have photo-diodes lying in the marginal zone of the light rays coming from the respectively associated control tracks of the information vehicle and these photo-diodes are control elements, responding to a change between light and dark, of a circuit regulating the resetting control.

In accordance with a convenient feature of the invention the diode group serving for the compensation of the horizontal displacements of the information vehicle, are arranged as near as possible to the center of the array and the diode group serving the compensation of the horizontal information vehicle is arranged at one end of the array.

The photo-diode array can be coordinated with a memory device for storage of the signals registered by the photo-diode array and from the memory the recovered information can be read out with any desired frequency independently of the playback frequency.

The track, provided for reproduction of the pictures, of the information vehicle can have black and white sections for a red component, for a black and white component and for a blue component.

In accordance with a convenient arrangement the individual tracks of the information vehicle are separated from each other by opaque strips, such opaque strips also serving for separating neighboring individual picture sections.

LIST OF THE SEVERAL FIGURES OF THE DRAWINGS

One embodiment of the invention will be described in what follows in detail with reference to the accompanying drawings.

Figure 2:
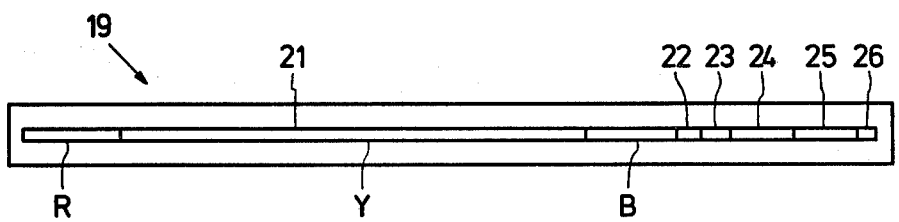
FIG. 2 shows a plane view on a larger scale of the photo-cell array as represented in FIG. 1.
Figure 4A:
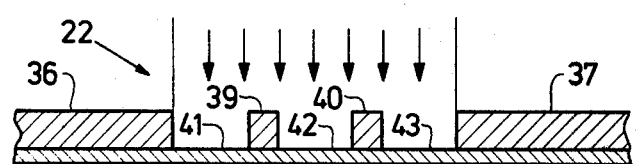

FIGS. 4a, b and c show on an enlarged scale a partial elevation of the photodiode array represented in FIG. 2 in various conditions of operation.

Figure 5A:
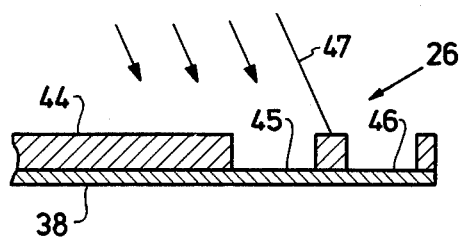

FIGS. 5a, b and c show an other partial elevation on a larger scale showing the photodiode array of FIG. 2 in different operational conditions.

Figure 1:
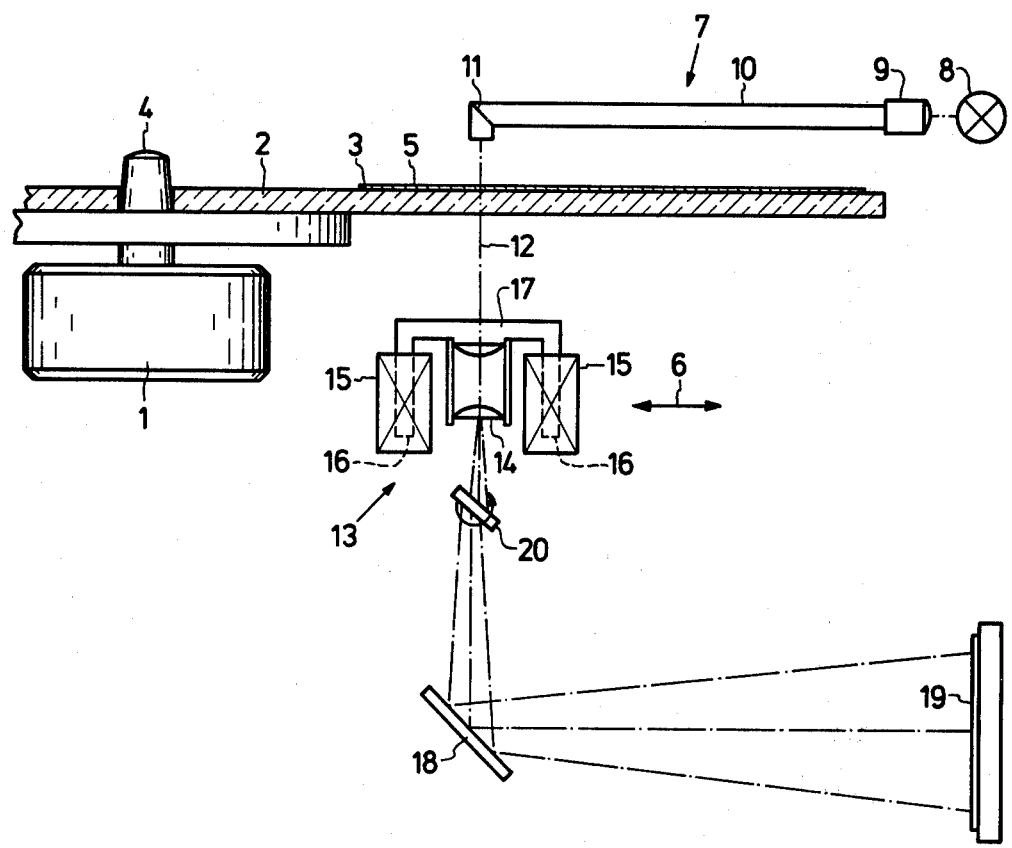
FIG. 1 shows diagrammatically a view of the arrangement of the invention.

FIG. 6 is a section of the ray path of the arrangement of FIG. 1 shown diagrammatically.

DESCRIPTION OF PREFERRED EMBODIMENT

The ray path and the control device of the arrangement in accordance with the invention will firstly be described with reference to FIG. 1. On the transparent turntable 2 driven by the motor 1 a circular disc-like information vehicle 3 is carried, is transparent and carries picture, audio and control information. The vehicle has a central opening into which a mandril or stud 4 lying coinciding with the axis of rotation of the motor 1 lies. The information vehicle 3 has on its surface a layer or film 5 adapted to modulate transmitted light. The layer 5 comprises optical picture, audio and control information in a parallel, spiral arrangement.

An illuminating arm 7 is provided on a slide adapted to move in a radial direction with respect to the information vehicle 3 in the plane of the drawing in the direction of the double arrow 6. This slide is not shown in FIG. 1 and is driven by a lead screw. The right hand end of the arm 7 lies in front of the light source 8, from which the light emitted by it passes through a condenser 9, a light guide rod 10, provided in the illuminating arm 7, and a deflecting prism 11 perpendicularly through the information vehicle as a collimated light ray or beam 12 with a diameter of two to three mm. The light is modulated in the layer 5. The optical system 13, lying in the axis of this ray 12 and which is arranged beneath the information vehicle, is, like the illuminating arm 7, arranged on the same slide which is not shown and is adapted to be moved by lead screws. It is moved together with the slide on reproducing the information vehicle 3 by rotation of the lead screws radially from the outside in an inward direction.

The optical system 13 consists of the following elements to be described. In the ray path of the light ray 12 there is an objective 14, which in its optic axis can be moved by a magnetic force acting against a resilient force. Reference 15 indicates two magnet coils, into which the rod-shaped magnets 16 extend. These magnets are connected to a yoke 17, which carries the objective 14. The light ray 12 spread out by the objective 14 is laterally deflected by the fixed mirror 18 and impinges on a single line array 19 of photo-diodes. In the ray path of the light ray 12 there is furthermore, closely following the objective 14, a quartz plate 20 with parallel surfaces and this plate can be turned about an axis, perpendicular to the picture plane in FIG. 1, against a spring force in a conventional manner with the help of a rotary magnet.

The whole system 13, consisting of the objective 14, with its magnet control means 15, 16 and 17, the quartz plate 20, the mirror 18 and the array 19 is adapted to be moved in parallelism with the illuminating arm 7 in the manner already described in a direction radial with respect to the disc so that a combined information track running in a spiral on the disc and consisting of an optical picture and audio track and of optical control tracks can be sensed or picked up.

Figure 3:
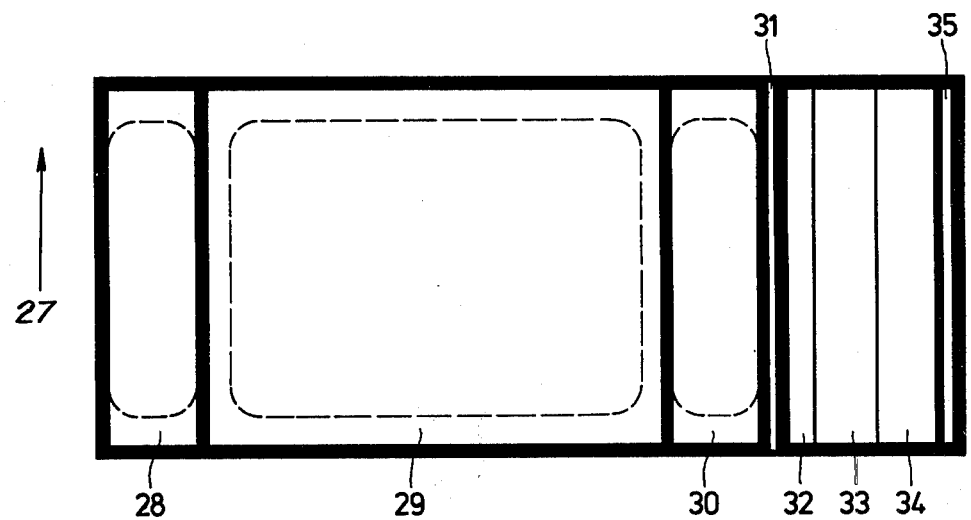
FIG. 3 shows a plane view on a larger scale of a section, corresponding to an individual picture, from the information track of an information vehicle as used in the arrangement in accordance with FIG. 1.

The individual diode groups of the photo diode array 19 shown on a larger scale in FIG. 2 are described in what follows with respect to their intended purpose for the individual sections of the information track, as they are indicated in FIG. 3. The diodes are of the same sensitivity monochromatically for changes in brightness, this also applying when they are to respond to binary or yes and no information. The individual sections or individual diodes are separated from each other by dummy circuited diodes or covers. The diode group which is furthest to the left is intended for the pick up of picture information and is denoted by reference 21. In it the reference R denotes the red component, Y denotes the diodes intended for the black and white component and B denotes those diodes for the blue component. For the red and blue components compressed together in a conventional manner for example respectively 175 diodes are provided while for the component denoted by Y 833 diodes are provided. To the right of this there then follows a diode group 22 for compensation for horizontal disc displacements. This is followed in turn by diode group 23 for a signal track, which controls the speed of rotation of the motor 1 in order to keep constant the angular velocity of the respective parts of the information track of the information vehicle which are picked up. The then following two diode groups 24 and 25 are respectively intended for information of one audio track, and together these tracks form a stereo audio track. The right hand end of the array formed by a diode group 26 for the compensation for vertical movements of the information vehicle.

FIG. 3 shows a section of the spirally arranged information track on the information vehicle in plane view. The section comprises an individual picture with associated information tracks for audio information and control information. The direction of movement of the information track on performance is denoted by arrow 27. The information track is divided up from the right to the left in the same manner as the array 19. Accordingly the section 21 R is the red component 28, the section 21 Y is the black and white component 29 and the section 21 B is the blue component 30. All these pictures are black and white. The narrow strip-like section 31 corresponds to the control diodes 22 for the compensation for horizontal movements of the information vehicle. The section 32 of the diode group 23 serves for ensuring constant speed running of the vehicle 3. The sections 33 and 34 comprise the audio information for the diode groups 24 and 25. The section 35, which is again in the form of a strip, is a signal track for the diode group 26 for compensation of vertical displacements or movements of the information vehicle. The individual picture and control track sections are separated from each other and separated from the preceding and following pictures by opaque margins in order to avoid overlap in signals.

Horizontal displacement of the information vehicle, that is to say displacements which lie radially in its plane, can occur if the information vehicle is not exactly centered on the axis of the turntable 3. Such a centering could only be ensured with a very elaborate arrangement and for this reason compensation for such movements is appropriate. Such displacements result in a rhythmic drift of the section, projected on the array 19, of the information track to the right or the left.

The diode group 22 provided for the compensation of the horizontal displacements of the information vehicle is represented diagrammatically in FIGS. 4a, b and c to show its function. On both sides of this diode group broad covers 36 and 37 of the sensor layer 38 are provided, which are to avoid signal overlap. Between these covers and the narrow covers 39 and 40 three surfaces of the sensor layer are left exposed, formed by the photo diodes 41, 42 and 43. Reference 44 denotes the incident light beam or ray coming from the signal track 31. In accordance with FIG. 4b this light beam is displaced to the left and in FIG. 4c it is displaced to the right owing to a corresponding radial drift of the information vehicle. In FIG. 4a all three diodes 41, 42 and 43 are evenly illuminated, this corresponding to the normal coordination of the projected picture of the information track with respect to the array 19.

Figure 4B:
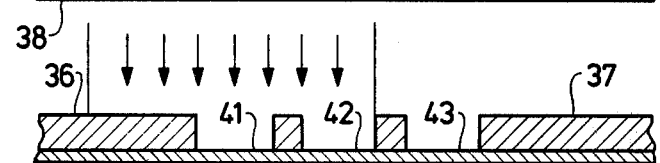
Figure 4C:
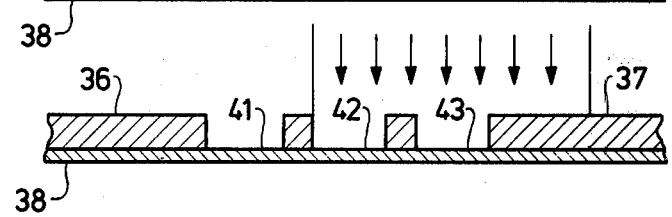

If this picture is displaced to the left the diode 43 on the right remains unilluminated and it is only the diodes 41 and 42 which are activated, as is represented in FIG. 4b. The result is then a signal for the reset control of the picture of the information track to the right. In the case of drift of the picture of the information track to the right owing to a corresponding movement of the information vehicle the left hand diode 41 is not illuminated, this resulting in a signal for the reset control of the picture towards the left.

The reset control is brought about in the case of the arrangement of FIG. 1 by turning the quartz plate 20, whose rotary magnet coil is energized in accordance with the signals mentioned.

In the case of an other embodiment of the invention the reset control can be brought about by slowing down or speeding up the displacement, which is radial with respect to the information vehicle, of the optic system 13 and of the illuminating arm 7.

Displacements of the information vehicle in a vertical direction, that is to say perpendicularly to its plane, can, in view of the low depth of field of the objective 14 practically not be mechanically suppressed and they are therefore compensated for in a conventional manner by displacements of the objective 14 so that a wall focussed picture from the information track is always incident on the array 19.

For compensating for this vertical movement of the diode group 26 is provided at the right hand end of the array and its construction and function is indicated diagrammatically in FIGS. 5a, b and c. The diode group 26 is separated by a broad cover 44 of the sensor layer 38 from the diode group 25. The diode group 26 consists of the two diodes 45 and 46. The right hand edge of the light cone coming from the objective 14 falls on the diode 46 in the case of a normal position of the information vehicle. This edge is denoted by the line 47, as shown in FIG. 5a.

Figure 5B:
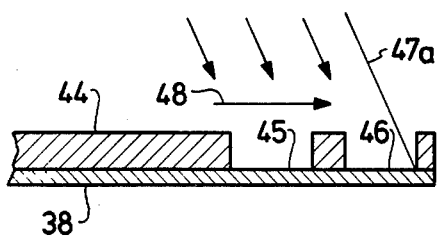
Figure 5C:
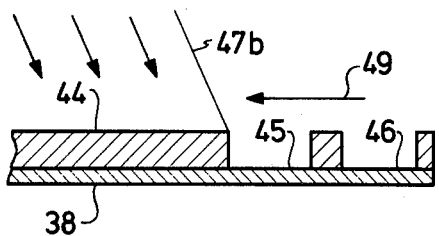

If the information vehicle 3 moves downwards, the edge 47 moves in the direction of the arrow 48 into the position, represented in FIG. 5b of the line 47a so that the diode 46 is now also illuminated. This then switches on a direct current circuit, with which the magnet coils 15 are connected and as a result the magnet cores 16, dipping into the coils 15, and the objective 14 are drawn downwards until the edge 47 of the light cone has returned to its initial position on the diode 45, following which this circuit is switched off. If the edge 47 of the light cone moves to the left in the direction of the arrow 49 into the position indicated by the broken line 47b, something which happens when the information vehicle 3 moves upwards, the diode 45 will no longer be illuminated and as a result the current circuit, which is connected with the magnet coils 15, will be energized in the opposite direction. The magnet cores 17 will be displaced upwards owing to the reversal of the magnetic field of the coils 15 and as a result the objective 14 will be raised until the edge of the light cone has been reset in its initial position.

The systems controlled by the diode groups 22 and 26 cannot interfere with each other, since in the case of horizontal displacements of the light strip 31 the position of the edge 47 of the light ray remains unchanged and the light strip only becomes displaced within this light cone which remains unchanged. The control via the diodes 45 and 46 is therefore not caused to take place! A displacement, which would otherwise take place, of the light strip 31 owing to a vertical displacement of the information vehicle 3 is avoided on the other hand since, as is indicated in FIG. 6, the control by the diode group 26 always starts before the response of the diode group 22. The distance a in FIG. 6, which indicates the movement of the edge 47 of the light cone on the diode group 45, is always larger than the distance b, which represents the movement of the light strip 31.

The movement of the edge 47 therefore moves over the diode 45 always before the light strip 31 drifts from the diode 41 or respectively 43, since in this case the reset control, started by the diode group 26, has already been effected.

On rotation of the disc 3 and the displacement, occurring in accordance with the lead of the spiral of the information track, of the illuminating arm 7 and of the optical device 13 the information track is sequentially projected by the objective 14 on the array 19. In accordance with the switching frequency of this array in this manner the information track is picked up line by line and by means of the control measures described the projected picture is always held in position on the array, in which the individual sections of the information track lie on the diode groups intended for it. By selecting the switching frequency of the array or by storing the information picked up by the array and reading it in any desired frequency the line frequency can be set to match the reproduction frequency of a conventional TV set. In this respect the flow of information can be extended by repeated reading out of individual lines. It is also possible to produce still pictures by storing the line sequence, resulting from a picture of the information strip, and is repeated line by line reading out.

Devices for switching over from one picture to the next one are not necessary in the reproducing device itself and in fact the function of such devices is ensured in the reproducing device in a conventional manner by flyback to the starting point of a picture, while the read out of the information track itself occurs continuously.

The carrying out of the division up of the pictures to be reproduced in color components before copying of the information track on to the information vehicle 3 makes it unnecessary to provide a color sensitive photo diode arrangement, something which not only leads to more accurate pictures but also quite substantially simplifies the duplication of the information layer and restricts it to black and white copying.

It is however possible in accordance with the invention for color sensitive diodes to be arranged in the array. In this case it will be a question of three diodes corresponding different colors as for example red, green and blue, the diodes being arranged in an alternating fashion one behind the other, though they are separately connected. The switching frequency and storage is then carried out in a manner similar to the arrangement described.

In the array 19 it is possible to provide a further diode group not shown in the drawing, which responds to digital encoded information in a further control track of the information vehicle, the track being projected on to this diode group. This diode group can for example consist of three or four diodes, which are connected with a counter. The encoded information of the control track is so associated with the individual information track sections, for example the individual pictures, that with the help of this arrangement a selection of individual pictures becomes possible or respectively the pictures can be reproduced individually by playing back the information vehicle until the desired individual picture is reached.

It is, of course, to be understood that the present invention is, by no means, limited to the specific showing in the drawings, but also comprises any modifications within the scope of the appended claims.

What I claim is:

1. In an audio-visual reproduction device for transmitted light recordings of picture, audio, and control signals, which associated with each other directly in a certain order on a spiral are provided on a disc-shaped information vehicle adapted to be turned about the center point of the spiral at an even speed of performance, and adjacent to the information vehicle has an arrangement adapted to move in a direction radial to the spiral on lead screws in synchronism with the playback of the information vehicle, the arrangement comprising: on one side of said information vehicle an illuminating device and on the other side an optical sensing device for the picture, audio and control signals, means for converting signals originating from the information vehicle into electric pulses adapted to be processed by a TV receiver, and for compensating for displacements of the information vehicle in the direction perpendicular to its plane on the basis of optical signals in order to keep in focus an objective for the picture signals, said optical signals being adapted to be derived from a signal track of the information vehicle and to change in accordance with its displacement perpendicular to its plane, an objective for continuously projecting the picture and the audio and control signals of the information track onto a single line photo diode array, said objective being operable automatically to follow the vertical displacements of the information vehicle i.e. such displacements as occur perpendicular to its plane, said information track having mutually parallel tracks for black and white picture information, optical audio information, an optical strip-like signal track for compensating for horizontal displacements of the information vehicle i.e. such displacements which occur in its plane in the radial direction, a signal track for controlling the speed of rotation necessary for an even play back of the information track of the drive motor for the turntable holding the information vehicle, and a strip-like control track for compensating for vertical displacements of the information vehicle, said photo diode array being divided into diode groups which correspond to the projected images of these aforementioned tracks and are arranged to be independent of each other in order to prevent overlap of signals by the use of non-photo sensitive intermediate spaces, means for resetting the lateral drift of the light cone which is incident on the photo diode array and originates with the objective in accordance with the illumination of diodes intended for the compensation of the horizontal displacements of the information vehicle by virtue of the signal track associated with said diodes, and means for follow-up of said objective in accordance with the illumination of the diodes intended for the compensation of the vertical displacements of the information vehicle by means of the control tracks associated with said diodes.

2. An audio-visual reproduction device according to claim 1, in which the means for resetting the light cone from said objective and incident on the photo diode array into its normal setting comprise quartz plate rotatably arranged in the ray path following the objective and have control means for controlling the speed of rotation of the motor driving the lead screw adapted to move radially with respect to the information vehicle the illuminating device and the optical system provided for pick up of the information of the information vehicle and the photo diode array.

3. An audio-visual reproduction device according to claim 1, in which the dependency of the compensation for the displacements of the information vehicle on the illumination of the diode groups intended for the respective resetting control is ensured by the feature that the diode groups, intended for the resetting control of the changes in position due to the displacements in the information vehicle, of the light cone coming from the objective, of the photo diode array, have photo diodes located in the marginal zone of the light rays coming from the respectively associated control tracks of said information vehicle, said photo diodes forming control elements responding to a change between light and dark of a circuit regulating the resetting control.

4. An audio-visual reproduction device according to claim 1, in which the diode group serving for the compensation of the horizontal displacements of said information vehicle is arranged as near as possible to the center of the array, and in which the diode group serving for the compensation of the horizontal movements of said information vehicle is arranged at one end of the array.

5. An audio-visual reproduction device according to claim 1, in which the output of the photo diode array is connected with a memory device for receiving signals registered by the photo diode array and from the memory device the information picked up being readable with any desired frequency irrespective of the reproduction frequency used for the information vehicle.

6. An audio-visual reproduction device according to claim 1, in which the tracks of the information vehicle provided for picture reproduction have black and white sections for a red component, for a black and white component and for a blue component.

7. An audio-visual reproduction device according to claim 1, in which the individual tracks of the information vehicle are separated inter se by opaque strips, and in which each individual picture section is separated from neighboring sections by opaque strips.

8. An audio-visual reproduction device according to claim 1, which includes a further diode group adapted to respond to digital encoded information of a further control track in the information vehicle, and in which the encoded information of said last mentioned control track is coordinated with the individual information track section.

* * * * *

UNITED STATES PATENT OFFICE
CERTIFICATE OF CORRECTION

Patent No. 4144542  Dated 13 March 1979

Inventor(s) Heinz Preuss

It is certified that error appears in the above-identified patent and that said Letters Patent are hereby corrected as shown below:

[73] Assignee: BTS - Systementwicklungs GmbH
Berlin, Fed. Rep. of Germany

Signed and Sealed this

Twelfth Day of June 1979

[SEAL]

Attest:

RUTH C. MASON
Attesting Officer

DONALD W. BANNER
Commissioner of Patents and Trademarks